(12) United States Patent
Saedifaez

(10) Patent No.: US 8,280,943 B1
(45) Date of Patent: Oct. 2, 2012

(54) MANAGING SERVICE PROVIDER MESSAGING

(75) Inventor: Sheida Saedifaez, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 160 days.

(21) Appl. No.: 12/910,724

(22) Filed: Oct. 22, 2010

Related U.S. Application Data

(60) Provisional application No. 61/362,230, filed on Jul. 7, 2010.

(51) Int. Cl.
*G06F 15/16* (2006.01)
(52) U.S. Cl. .......... 709/201; 709/223; 709/219
(58) Field of Classification Search .......... 709/201, 709/223, 219
See application file for complete search history.

(56) References Cited

U.S. PATENT DOCUMENTS

| | | | | |
|---|---|---|---|---|
| 7,236,780 | B2 * | 6/2007 | Benco et al. | 455/432.1 |
| 2003/0212598 | A1 * | 11/2003 | Raman et al. | 705/14 |
| 2008/0045234 | A1 * | 2/2008 | Reed | 455/456.1 |
| 2008/0071629 | A1 * | 3/2008 | Benson et al. | 705/26 |
| 2010/0002668 | A1 * | 1/2010 | Tan et al. | 370/338 |
| 2010/0203865 | A1 * | 8/2010 | Horn et al. | 455/411 |
| 2012/0011020 | A1 * | 1/2012 | Saedifaez | 705/26.5 |

* cited by examiner

*Primary Examiner* — Krisna Lim
(74) *Attorney, Agent, or Firm* — Knobbe Martens Olson & Bear LLP

(57) ABSTRACT

A system and method for management of service plan modification information between various service providers and telecommunications-based devices are provided. A service management component manages subscriber and service plan information for processing service plan modification requests from a service provider and a mobile device of a subscriber. The service management component processes updated service plan information provided by a service provider component and dynamically offers the updated services to subscribers. The service management component also enables subscribers to modify aspects of their service plans and have the modifications take effect immediately. The service management component maintains various data stores associated with subscriber information and service plan information that facilitate the offer of updated service plans, including service plan features and rule sets, received from a service provider component to subscribers at corresponding mobile devices. The service management component manages a framework that allows management of the updated service plan information.

29 Claims, 8 Drawing Sheets

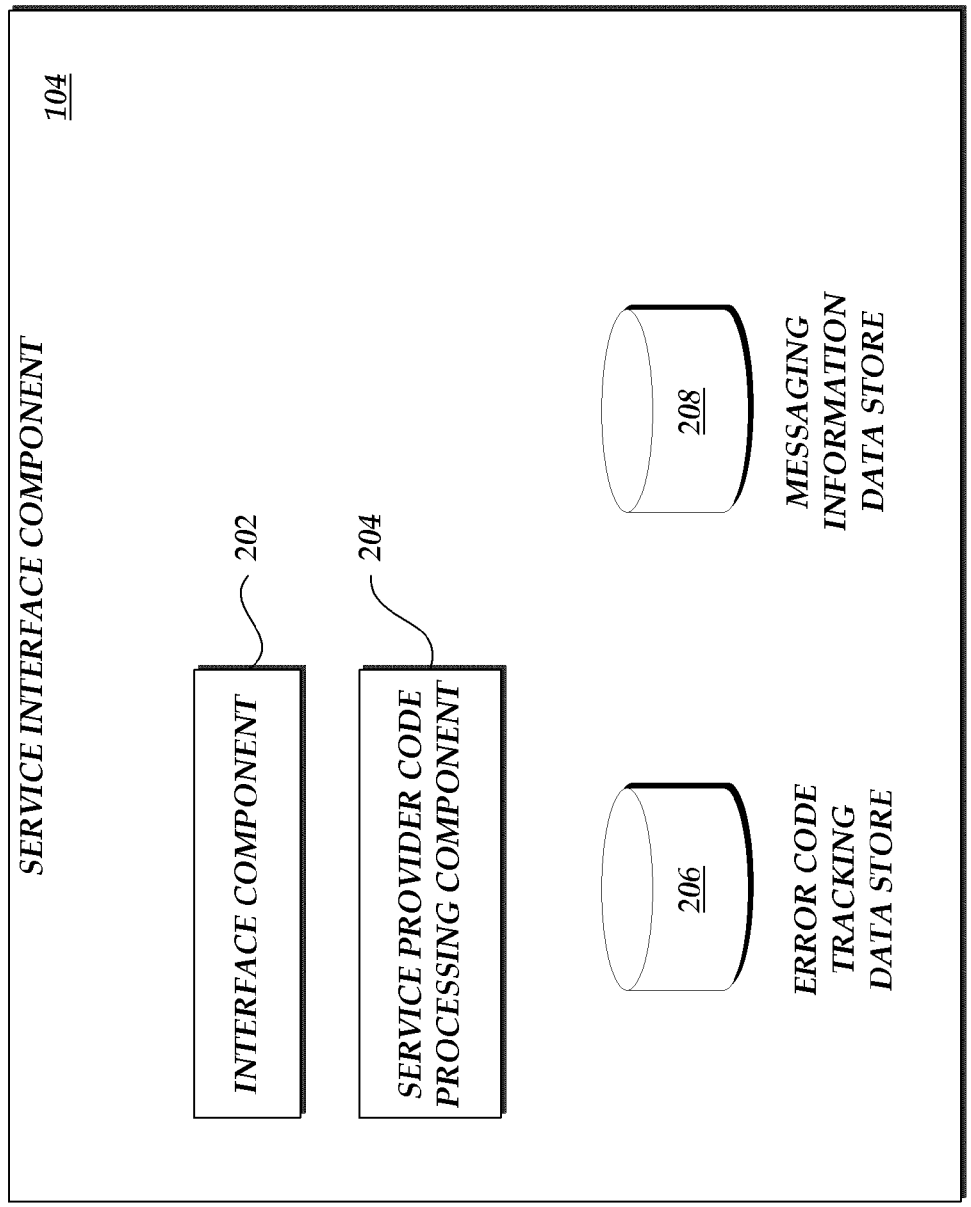

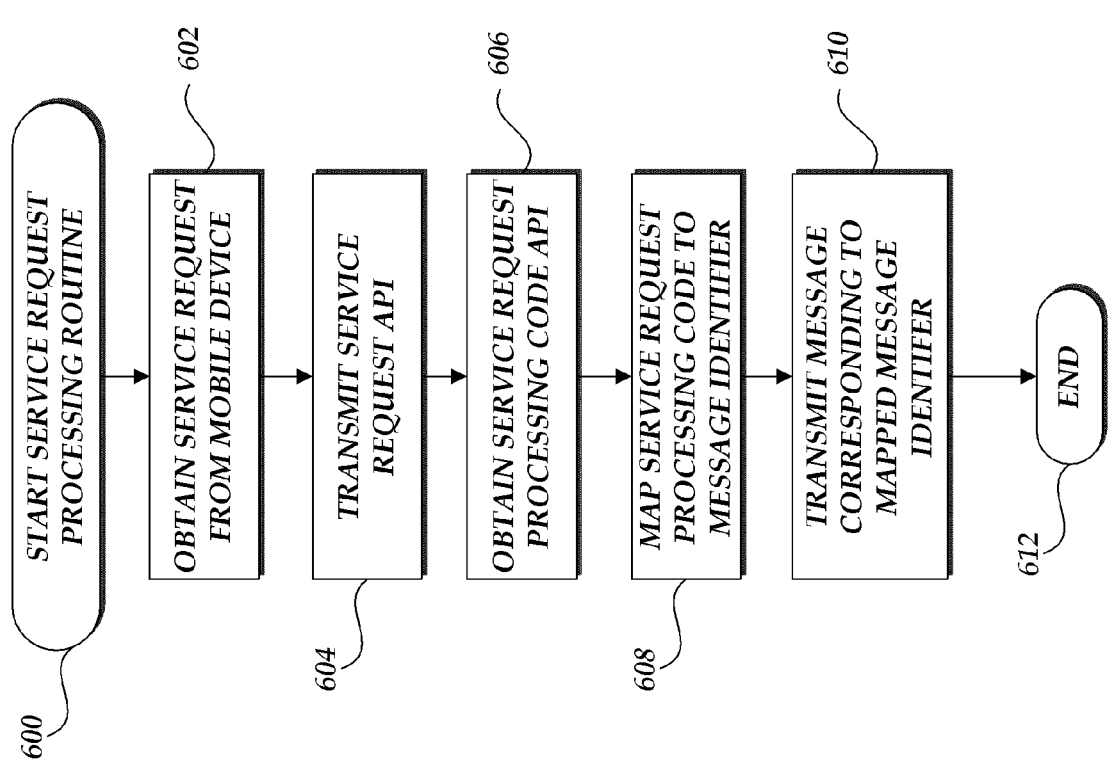

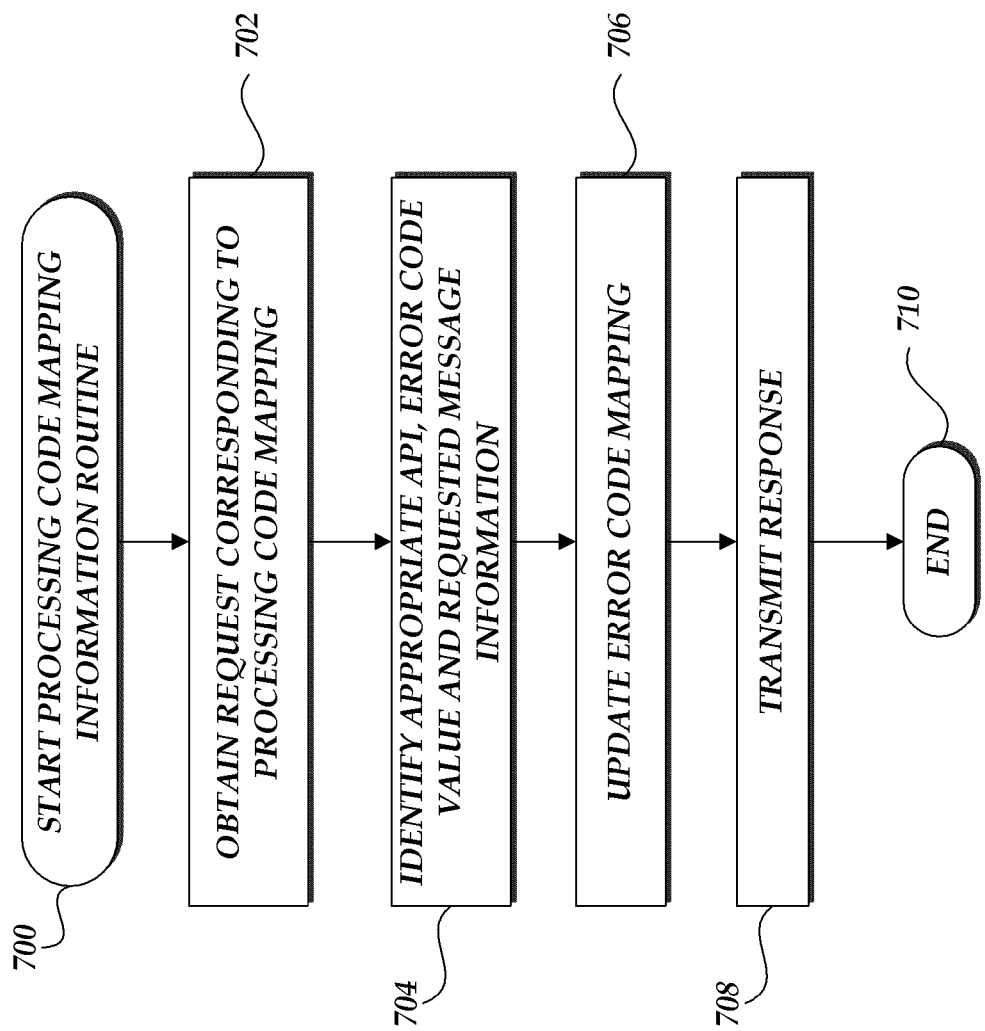

MANAGING SERVICE PROVIDER MESSAGING

CROSS-REFERENCE TO RELATED APPLICATION

This application claims the benefit of U.S. Provisional Patent Application No. 61/362,230, entitled "Managing Service Provider Messaging," and filed on Jul. 7, 2010. U.S. Provisional Application No. 61/362,230 is incorporated by reference herein.

BACKGROUND

Generally described, computing devices and communication networks facilitate the collection and exchange of information. Utilizing a communication network and relevant communication protocols, a computing device can engage in data communications with a wide variety of computing devices. In accordance with a telecommunications-based environment, telecommunications-based devices, such as mobile terminals, establish communications with various computing devices via a wireless communication network provided by a wireless communication service provider.

In one embodiment, users associated with a telecommunications-based device can manage one or more services provided by the wireless communication service provider. For example, a user may wish to manage information associated with a user account, such updating billing information, modifying one or more aspects of a wireless service account (e.g., selecting rate plans, upgrading devices, etc.), and the like. In another example, a user may wish to access enhanced services provided by the wireless communication service provider, such as location based services, data processing services, etc. In one embodiment, the services provided by the wireless service provider are facilitated through interactions between the user of a telecommunications-based device and one or more service provider components via a communication network, such as the Internet.

To facilitate the management of services, a wireless communication service provider can maintain a central interface component that functions as an interface between the telecommunications-based devices and various service provider components, such as an accounting/billing service provider component, etc. In accordance with this embodiment, the central interface component obtains telecommunications-based device-based requests and transmits the requests to an appropriate service provider component, such as via an established application program interface ("API"). Based on the processing of the request, the service provider component returns information to the central interface component, typically via an established API.

For service requests that require information to be communicated to the requesting telecommunications-based device, a typical central interface component returns processing codes to the requesting telecommunications-based device. For example, in the event that an error occurs in processing the service request, the requesting telecommunications-based device would receive an error code from the central interface component. In some embodiments, a telecommunications-based device may maintain messaging information that can provide a user with additional context as to the received error code. However, the amount of messaging information maintained by the telecommunications-based device can be limited and is not easily updated by the wireless service provider.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein:

FIG. 2A is a block diagram illustrative of components of a service interface component;

FIG. 6 is a flow diagram illustrative of a service request processing routine implemented by a service interface component; and FIG. 7 is a flow diagram illustrative of a request code mapping processing routine implemented by a service interface component.

THE DETAILED DESCRIPTION

Generally described, aspects of present disclosure relate to the management of communications related to telecommunications-based devices. In an illustrative embodiment, the present disclosure relates to the management of messaging information between various service providers and telecommunications-based devices. In one embodiment, a service interface component manages error code messaging information for processing service provider component error codes corresponding to a request for services from a telecommunications-based device, such as a mobile device. The service interface component processes error code information provided by a service provider component and generates messaging information to be provided to a user associated with the requesting mobile device. The service interface component maintains various data stores associated with messaging information and error code information that facilitates a mapping of error code information received from a service provider component to messaging information to be provided to a mobile device. Additionally, the service interface component manages a framework that allows the management of the mapping information.

Although aspects of the present disclosure will be described with regard to an illustrative telecommunication environment and component interactions, communication protocols and flow diagrams, one skilled in the relevant art will appreciate that the disclosed embodiments are illustrative in nature and should not be construed as limiting. While the present disclosure will be described with regard to error code processing information, one skilled in the relevant art will appreciate that various types of processing information may be managed in accordance with aspects of the present disclosure. Additionally, although the terms telecommunications-based device or mobile device are used in this document, the terms represent any type of device having a component for communicating with one or more other devices via one or more communication paths. Such communication paths can include wireless communication paths (via infra-red, RF, optical, terrestrial, or satellite communication media) and wired communication paths. Still further, although the present disclosure references a telecommunications-based device, one skilled in the relevant art will appreciate that a telecommunications-based device may also be referred to as a wireless computing device, a mobile communication device, a mobile terminal, or a computing device. Examples of telecommunication devices or mobile devices are described below with regard to FIG. 1. Accordingly, reference to a telecommunications-based device or mobile device should not be interpreted as including any particular functionality or operation not described in the present disclosure.

Figure 1:
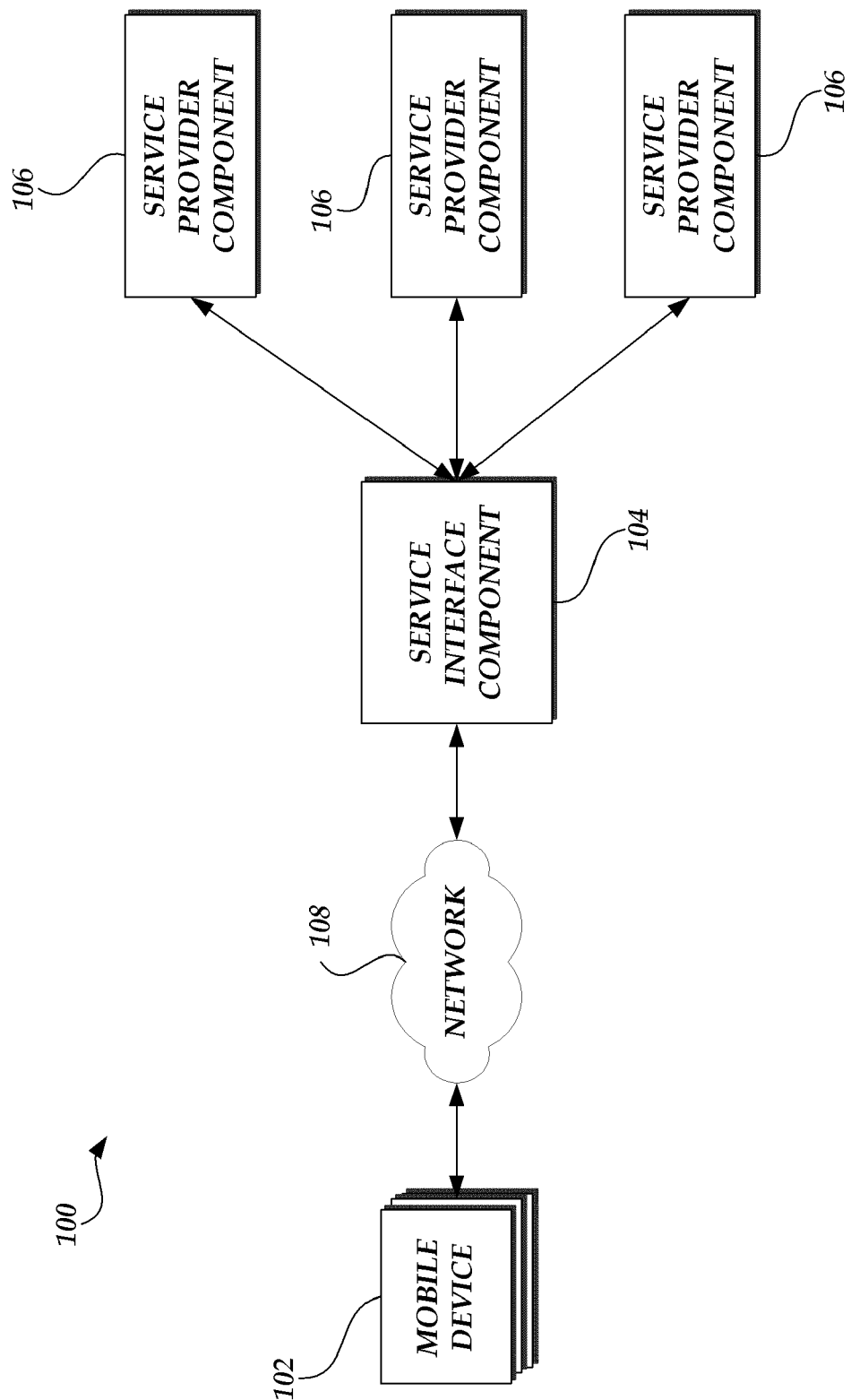
FIG. 1 is a block diagram illustrative of a telecommunication environment including a number of mobile devices, a service interface component, and a number of service provider components.

With reference now to FIG. 1, an embodiment of an illustrative telecommunication environment 100 will be described. The telecommunication environment 100 can include a number of telecommunications-based devices, such as mobile devices 102, associated with users. The mobile devices 102 can correspond to a wide variety of devices or components that are capable of initiating, receiving or facilitating communications over a communication network 108 including, but not limited to, personal computing devices, electronic book readers (e.g., e-book readers), hand held computing devices, integrated components for inclusion in computing devices, home electronics, appliances, vehicles, machinery, landline telephones, network-based telephones (e.g., voice over IP ("VoIP"), cordless telephones, cellular telephones, smart phones, modems, personal digital assistants, laptop computers, gaming devices, media devices, and the like. In an illustrative embodiment, the mobile devices 102 include a wide variety of software and hardware components for establishing communications over one or more communication networks, generally referred to as communication network 108, including wireless communication network or a wired communication network (not shown). Illustrative components of a mobile device 102 will be described in greater detail with regard to FIG. 2B.

With continued reference to FIG. 1, the telecommunication environment 100 includes one or more computing devices, generally referred to as a service interface component 104, in communication with the mobile devices 102. In an illustrative embodiment, the service interface component 104 can maintain data, such as in the form of data tables, that facilitate the management of messaging information to be provided to the mobile devices 102. Specifically, in an illustrative embodiment related to the management of error messaging information and error codes, the service interface component 104 can illustratively maintain one or more messaging data tables and one or more error code mapping tables. Examples of a messaging data table and an error code mapping table will be described with regard to FIG. 5. Illustrative components of a service interface component 104 will be described in greater detail with regard to FIG. 2A. One skilled in the relevant art will appreciate that the service interface component 104 is not limited to any specific structure, architecture, or set of components.

The telecommunication environment 100 also includes a number of service provider components 106 in communication with the service interface component 104. Illustratively, the service provider components 106 provide services to the mobile devices 102 via requests transmitted over the communication network 108. Such service provider components 106 are sometimes referred to generally as backend systems or backend processes. As previously indicated, examples of the services provided by the one or more service provider components include, but are not limited to, managing information associated with user accounts, such updating billing information, modifying aspects of a wireless service account (e.g., selecting rate plans, upgrading devices, etc.), downloading software components/applications, and the like. In other examples, the services provided by the one or more service provider components include location based services, identity services, data enhancements services, data processing services, commerce services, and the like.

With reference now to FIG. 2A, illustrative components of a service interface component 104 will be described. As illustrated in FIG. 2A, the service interface component 104 can include an interface component 202 for communicating with various components of the telecommunication environment 100. Illustratively, the interface component 202 can communicate with one or more mobile devices 102 via established protocols, such as one or more APIs. Likewise, the interface component 202 can communicate with one or more service provider components 106 via established communication protocols, such as one or more APIs. Illustratively, the interface component 202 can be configured to communication with the service provider components 106 and mobile devices 102 in accordance with multiple APIs. Although the interface component 202 is illustrated as a single component, one skilled in the relevant art will appreciate that the service interface component 104 may utilize separate components to communicate with different components of the telecommunication environment 100.

The service interface component 104 also includes a service provider code processing component 204 for processing service provider requests from a mobile device 102 and forwarding the requests to a corresponding service provider component 106. The service provider code processing component 204 also processes processing codes, such as error codes, returned from the service provider component 106 and maps the processing codes to one or more messages. As previously discussed, the service interface component 104 maintains one or more data stores for facilitating the processing of service requests, managing processing code information and managing messaging information. Illustratively, the service interface component 104 includes an error code tracking information data store 206 for maintaining mapping information between processing codes, such as error codes, and messaging information. The service interface component 104 also maintains a messaging information data store 208 for maintaining messaging information to be provided to mobile devices 102. Although the error code tracking information data store 206 and the messaging information data store 208 are illustrated as a single data store, one skilled in the relevant art will appreciate that either data store may be made up of any number of data stores, databases, or files. Additionally, the error code tracking information data store 206 and the messaging information data store 208 may be implemented in a distributed manner via a communication network, such as the Internet or a private communication network.

One skilled in the relevant art will appreciate that the service interface component 104 and its various components may be implemented by a one or more computing devices, or a computing system. Each of the computing devices may include one or more processing units, such as one or more CPUs. The computing devices may also include system memory, which may correspond to any combination of volatile and/or non-volatile storage mechanisms. The system memory may store information which provides an operating system component, various program components, program data, and other components. The computing devices may also include one or more input devices (keyboard, mouse device, specialized selection keys, etc.) and one or more output devices (displays, printers, audio output mechanisms, network interfaces, etc.). The computing devices perform functions by using the processing unit(s) to execute instructions provided by the system memory. The above-enumerated list of components is representative and is not exhaustive of the types of functions performed, or components implemented, by a computing device. One skilled in the relevant art will appreciate that additional or alternative components may also be included in a computing device, or computing system made up of one or more computing devices, to carry out other intended function of the service interface component.

Figure 2B:
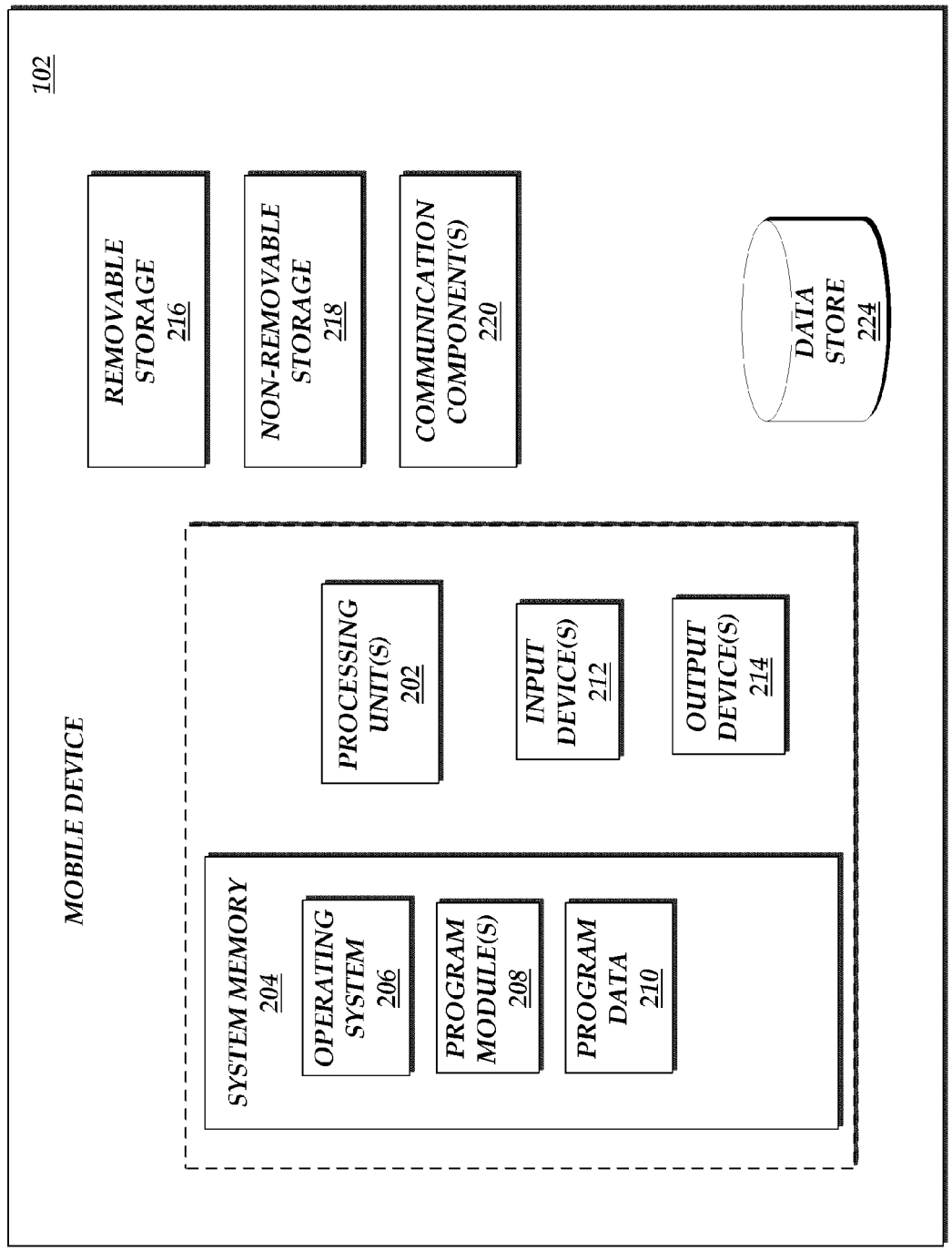
FIG. 2B is a block diagram illustrative of components of a mobile device.

With reference now to FIG. 2B, illustrative components of a telecommunication device, such as a mobile device 102, for use in the generation of service requests will be described. The mobile device 102 may include one or more processing units 202, such as one or more CPUs. The mobile device 102 may also include system memory 204, which may correspond to any combination of volatile and/or non-volatile storage mechanisms. The system memory 204 may store information which provides an operating system component 206, various program components 208, program data 210, and other components. The above-enumerated list of components is representative and is not exhaustive of the types of functions performed, or components implemented, by the mobile device 102. One skilled in the relevant art will appreciate that additional or alternative components may also be included in the telecommunications-based device 102 to carry out other intended functions such as a mobile telephone functions. The mobile device 102 performs functions by using the processing unit(s) 202 to execute instructions provided by the system memory 204. The mobile device 102 may also include one or more input devices 212 (keyboard, mouse device, specialized selection keys, etc.) and one or more output devices 214 (displays, printers, audio output mechanisms, etc.).

With continued reference to FIG. 2B, the mobile device 102 may also include one or more types of removable storage 216 and one or more types of non-removable storage 218. Still further, the mobile device 102 can include communication components 220 for facilitating communication via wired and wireless communication networks, such as the wireless communication network 104 and data network 118 (FIG. 1). Examples of various communication protocols include, but are not limited to, Bluetooth, the family of IEEE 802.11 technical standards ("WiFi"), the IEEE 802.16 standards, short message service ("SMS"), voice over IP ("VoIP"), as well as various generation cellular air interface protocols (including, but not limited to, air interface protocols based on CDMA, TDMA, GSM, WCDMA, CDMA2000, TD-SCDMA, WTDMA, LTE, OFDMA, WiMAX, and similar technologies).

Figure 3:
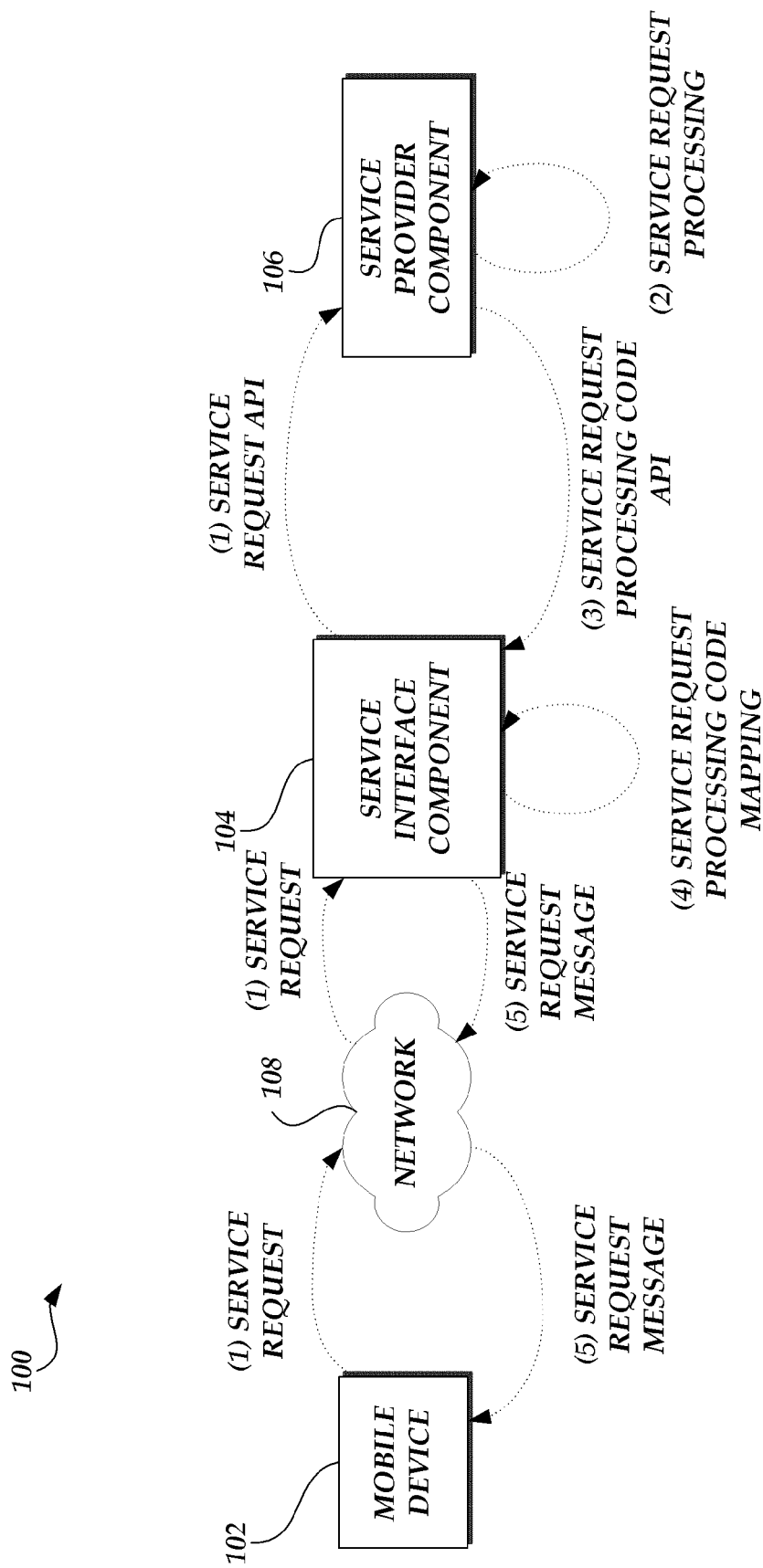
FIG. 3 is a block diagram of the telecommunication environment of FIG. 1 illustrating an embodiment for the processing of mobile device service requests.

Turning now to FIG. 3, a block diagram of the telecommunication environment 100 of FIG. 1 illustrating an embodiment for the processing of mobile device service requests by the service interface component 104 will be described. As illustrated in FIG. 3, a mobile device 102 transmits a service request to the service interface component 104 via the communication network 108. The service request may be transmitted via an established protocol, such as an API. Based on the service request, the service interface component 104 identifies one or more service provider components 106 to receive the corresponding service request and transmits the service request to the identified service provider component 106. The transmission of the service request may be transmitted in accordance with an established protocol, such as an API.

The service provider component 106 processes the request and generates a response. The response is transmitted to the service interface component 104 via an established protocol, such as an API. The response can include one or more processing codes, such as error codes, that correspond to the processing of the service request. Illustratively, the processing codes can be encompassed as fields or values to be specified in the API. In one embodiment, one or more service provider components 106 can share a common API for communicating with the service interface component 104. Alternatively, individual service provider components 106 may maintain unique APIs for communicating with the service interface component 104. Additionally, the response can not have any messaging information corresponding to messaging information to be provided to the mobile device 102.

Based on the information included in the response from the service provider component 106, the service interface component 104 dynamically maps processing code information to at least one messaging identifier. With reference to an error code processing embodiment, the service interface component 104 dynamically maps error codes included in the response from the service provider component 106 with a messaging identifier maintained in the error code tracking data store 206 (FIG. 2). The service interface component 104 then dynamically obtains messaging information associated with the messaging identifiers, such as from the messaging information data store 208 (FIG. 2). The service interface component 104 then transmits the corresponding messaging information to the requesting mobile device 102.

Figure 4:
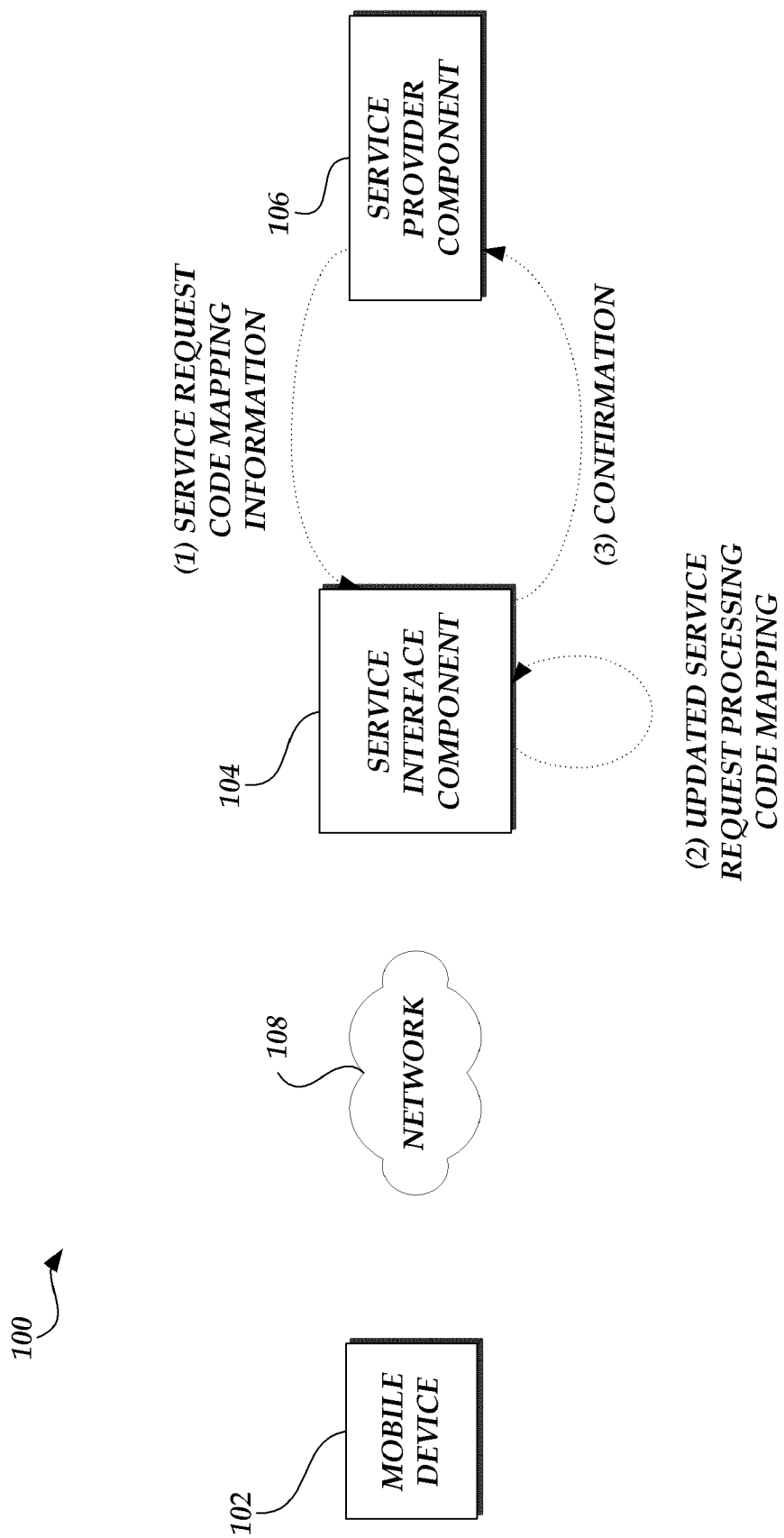
FIG. 4 is a block diagram of the telecommunication environment of FIG. 1 illustrating an embodiment for the processing of service request code mapping information by a service interface component.

With reference now to FIG. 4, a block diagram of the telecommunication environment of FIG. 1 illustrating an embodiment for the processing of service request code mapping information by a service interface component 104 will be described. As illustrated in FIG. 4, a service provider, such as via service provider component 106, transmits service request code mapping information to the service interface component 104. The transmission of the service request code mapping information may be in accordance with an established protocol, such as an API. Examples of the service request code mapping information can include, but are not limited to, the modification of mapping information mapping processing codes with messaging identifiers, the managing of messaging information associated with the messaging identifiers, and the like.

Based on the receipt of the request from the service provider component 106, the service interface component 104 processes the requests and modifies one or more of the data stores. With reference to an error code processing embodiment, the service interface component 104 dynamically updates error codes included in the response from the service provider component 106 with a messaging identifier maintained in the error code tracking data store 206 (FIG. 2). The service interface component 104 can also dynamically update messaging information associated with the messaging identifiers, such as from the messaging information data store 208 (FIG. 2). The service interface component 104 can then optionally transmit an acknowledgment or confirmation to the requesting service provider component 106. Based on the dynamically updated information, subsequent service requests from mobile devices 102 resulting in the same processing code will receive the updated messaging information without having to include the messaging information in the response from the service provider component 106 or updating the mobile device 102.

Figure 5:
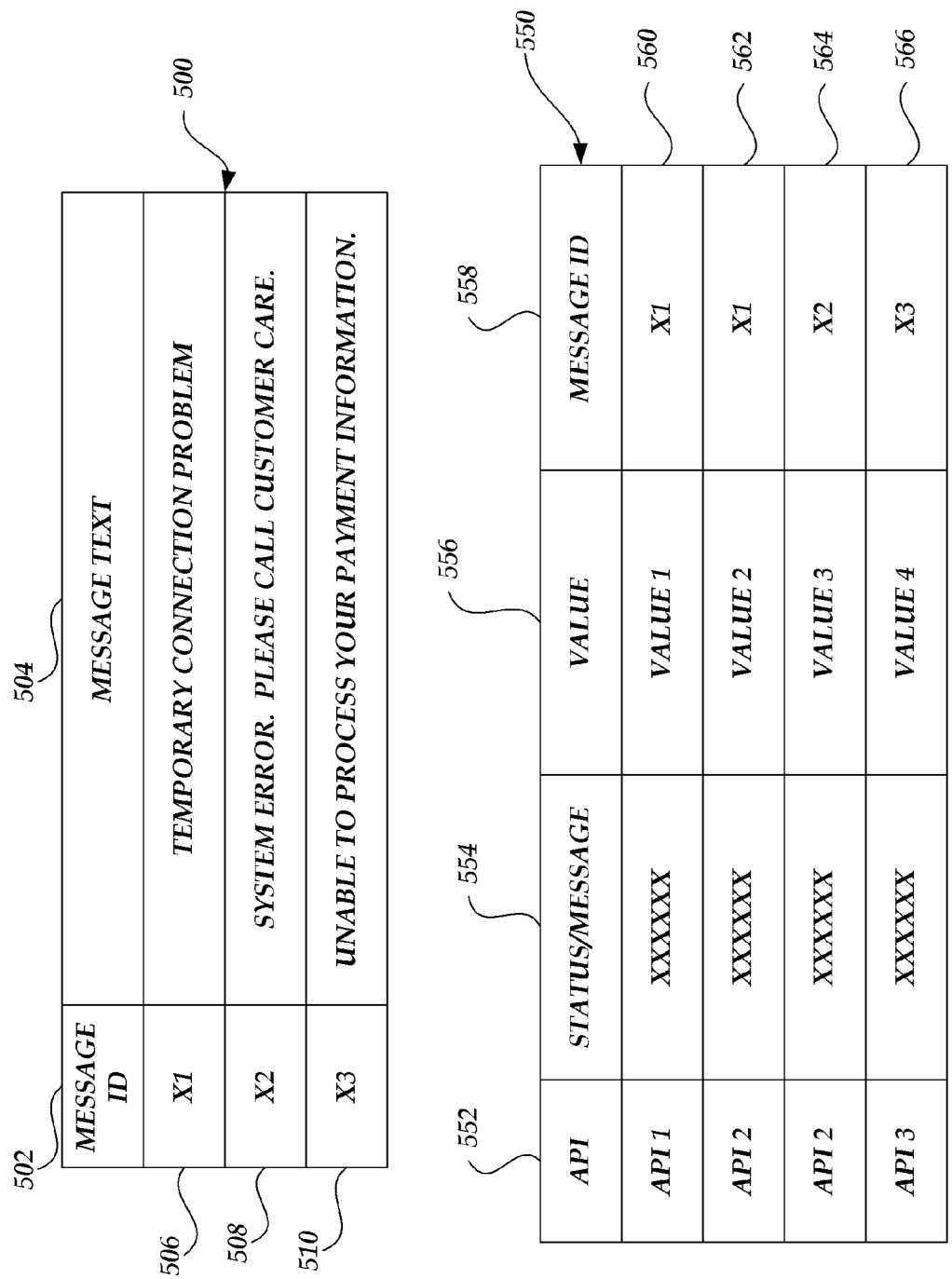
FIG. 5 is a block diagram illustrative service request code mapping information utilized by a service interface component.

With reference now to FIG. 5, a block diagram illustrative of various information utilized by a service interface component 104 for mapping processing codes with messaging information will be described. The information includes an illustrative messaging information data table 500 for maintaining messaging information. The messaging information data table 500 includes a first column 502 for maintaining messaging identifiers utilized to match message text or other messaging information. The messaging identifiers may be unique identifiers such that two different messaging information will not have a common identifier. For example, if the service interface component 104 is maintained by a third party service with multiple service providers utilizing the service interface component 104 globally unique message identifiers can prevent any type of messaging overlap. Alternatively, one or more of the messaging identifiers may also overlap or have common subject matter for sharing messaging information between service providers or within a service provider context. For example, a single messaging identifier can be mapped to different language versions of messaging information.

With continued reference to the messaging information data table 500, column 504 includes an identification of messaging information to be provided to a mobile device 102. Although messaging information in column 504 is illustrated as textual data, one skilled in the relevant art will appreciate that the messaging information can include other types of information, including multi-media information, and the like. In such embodiments, the messaging information data table 500 may include multiple columns mapped to messaging identifiers, or portions of messaging identifiers, to message content. For example, a service provider component 106 may not only be able to specify an error code, but perhaps the type of message content (e.g., video vs. text) that will be transmitted. In another example, a service provider component 106 or mobile device may specify a preferred language for the messaging information. With reference to an illustrative example, the messaging information data table 500 includes three rows 506, 508, 510 that correspond to messaging information that may be provided by a service interface component 104.

With reference again to FIG. 5, the information utilized by a service interface component 104 for mapping processing codes with messaging information also includes a processing code mapping information data table 550. The processing code mapping information data table 550 includes a first column 552 for identifying specific protocols, such as APIs, that will specify processing codes from a service provider component 106. The processing code mapping information data table 550 also includes one or more columns for identifying values of the processing codes that will be used to map to particular messaging identifier. As illustrated in FIG. 5, the processing code mapping information data table 550 includes a second column 554 for specifying status/message types for the returned API and a third column 556 for specifying values of the processing code. The specification of the status/message type allows the service provider component 106 to distinguish from types of messages or service requests within the same API. However, column 554 may be omitted.

The processing code mapping information data table 550 also includes a column 558 for specifying one or more messaging identifiers for the values. As illustrated in FIG. 5, rows 560 and 564 specify a single messaging identifier for a value returned in an API, "API 1" and "API 3". Rows 562 and 564 specify different messaging identifiers for different values for the same API, "API 2". Thus, the service interface component 104 can dynamically map various processing codes to messaging identifiers and return different message content to a requesting mobile device 102.

Turning now to FIG. 6, a flow diagram illustrative of a service request processing routine 600 implemented by a service interface component 104 will be described. At block 602, the service interface component 104 obtains a service request from a mobile device 102. As previously described, in an illustrative embodiment, the service request may be obtained via an established communication protocol, such as API. At block 604, the service interface component 104 transmits a service request API to an identified service provider component 106. In one embodiment, the service interface component 104 may identify the appropriate service provider component 106 based on information maintained by the service interface component 104. In another embodiment, the identification of the particular service provider component 106 may be included in the mobile device request.

At block 606, the service interface component 104 obtains a processing code API from the identified service provider component 106. Illustratively, the processing code API includes a specification of at least one processing code, such as an error code. The processing code API can also include additional information such as message type information that specifies what type of content should be provided to the mobile device users (e.g., premium users obtaining enhanced content). However, illustratively, the processing code API would not include a messaging identifier or messaging content in the information. One skilled in the relevant art will appreciate that service provider components 106 can utilize the same APIs or processing code values in common APIs. Alternatively, each service provider component 106, or groups of service provider components, can utilize individualized or customized APIs or processing code values in common APIs.

At block 608, the service interface component 104 maps the service request processing codes included in the processing code API to identify one or more applicable messaging identifiers. The mapping of service request processing codes can be dynamic to reflect the most current updates to the messaging identifiers. At block 610, the service interface component 104 identifies the messaging content corresponding to the messaging identifiers and transmits the corresponding messaging content to the requesting mobile device 102. In an illustrative embodiment, the service interface component 104 can utilize one or more additional information sources to select from multiple, potentially applicable messaging content. For example, the service interface component 104 can obtain a preferred language for a mobile device user in the event that multiple language versions of the messaging content are available. In another example, the service interface component 104 can obtain other criteria, such as geographic information, time information, account status information associated with the mobile device user to facilitate selection of messaging content. For example, the service interface component 104 can select an "after hours" based message for processing codes received after normal business hours. Similarly, the service interface component 104 can select a "delinquent account" based message according to an account status associated with a mobile device user's account with the service provider. One skilled in the relevant art will appreciate that additional or alternative criteria may also be utilized in accordance with the present disclosure. At block 612, the routine 600 terminates.

With reference now to FIG. 7, a flow diagram illustrative of a request code mapping processing routine implemented by a service interface component 104 will be described. At block 702, the service interface component 104 obtains a request corresponding to processing code mapping information. As previously described, the request can include an addition of messaging information or messaging identifiers to a messaging information data store, a modification of mapping information mapping processing codes to message identifiers in a processing code data store, and the like. At block 704, the service interface component 104 identifies all relevant APIs, processing code values (e.g., error code values), and messaging identifiers that may need to be updated.

At block 706, the service interface component 104 updates the appropriate data stores corresponding to the request. At block 708, the routine 700 terminates.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware, or a combination thereof. As such, reference in the disclosure to actions performed by a module or component relates to the execution of executable instructions by a processing device, or devices, to cause the referenced action to be preformed.

Conditional language such as, among others, "can," "could," "might," or "may," unless specifically stated otherwise, are otherwise understood within the context as used in general to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented system for managing communications, the system comprising:
    an error code tracking data store for storing information mapping error code information to messaging identifiers;
    a messaging information data store for maintaining messaging information to be provided to mobile device users, the messaging information associated with at least a messaging identifier; and
    a computing device in communication with said data stores that is operative to:
        obtain a request from a mobile device corresponding to a request for processing by a service provider;
        transmit, via an established protocol, the request from the mobile device to an identified service provider component;
        obtain, via an established protocol, a response from the identified service provider component, the response including an error code associated with the processing of the request from the mobile device;
        identify at least one messaging identifier corresponding to the error code associated with the processing of the request from the mobile device from the error code tracking information data store;
        identify messaging information from the messaging information data store according to the identified at least one messaging identifier;
        transmit the messaging information to the mobile device;
        obtain, via an established protocol, at least one of an update to the messaging information data store and the error code tracking information data store; and
        update information based the at least one of an update to the messaging information data store and the error code tracking information data store.

2. The computer-implemented system as recited in claim 1, wherein the request from the mobile device corresponds to a request to update aspects of an account associated with a user account.

3. The computer-implemented system as recited in claim 1, wherein the computing device is further operative to:
    obtain a request from a second mobile device corresponding to a request for processing by the service provider;
    transmit, via an established protocol, the request from the second mobile device to the identified service provider component;
    obtain, via an established protocol, a response from the identified service provider component, the response including the error code associated with the processing of the request from the mobile device;
    identify at least one different messaging identifier corresponding to the error code associated with the processing of the request from the mobile device from the error code tracking information data store;
    identify messaging information from the at least one different messaging information data store according to the identified at least one messaging identifier; and
    transmit the messaging information to the second mobile device.

4. The computer-implemented system as recited in claim 1, wherein the update to the messaging information data store includes updating text associated with a messaging identifier.

5. The computer-implemented system as recited in claim 1, wherein the update to the error code tracking information data store includes a mapping of a different messaging identifier to an error code.

6. The computer-implemented system as recited in claim 1, wherein the computing device obtains the error code from the service provider component in accordance with an application protocol interface.

7. The computer-implemented system as recited in claim 1, wherein the messaging information data store includes messaging information corresponding to two or more languages associated with at least one messaging identifier and wherein the computing device is further operative to identify messaging information associated with one of the two or more languages responsive to the identified messaging identifier.

8. The computer-implemented system as recited in claim 1, wherein the computing device is further operative to identify messaging information associated in accordance with at least one additional selection criteria.

9. The computer-implemented system as recited in claim 8, wherein the additional selection criteria include at least one of a geographic criteria, language criteria, time criteria and account status criteria.

10. A computer-implemented system for managing communications, the system comprising:
- an error code tracking data store for storing information mapping error code information to messaging identifiers;
- a messaging information data store for maintaining messaging information to be provided to mobile device users, the messaging information associated with at least a messaging identifier; and
- a computing device in communication with said data stores that is operative to:
  - obtain a request from a mobile device corresponding to a request for processing by a service provider;
  - transmit, via an established protocol, the request from the mobile device to an identified service provider component;
  - obtain, via an established protocol, a response from the identified service provider component, the response including an error code associated with the processing of the request from the mobile device;
  - identify at least one messaging identifier corresponding to the error code associated with the processing of the request from the mobile device from the error code tracking information data store;
  - identify messaging information from the messaging information data store according to the identified at least one messaging identifier;
  - transmit the messaging information to the mobile device;
  - obtain a request from a second mobile device corresponding to a request for processing by the service provider;
  - transmit, via an established protocol, the request from the second mobile device to the identified service provider component;
  - obtain, via an established protocol, a response from the identified service provider component, the response including the error code associated with the processing of the request from the mobile device;
  - identify at least one different messaging identifier corresponding to the error code associated with the processing of the request from the mobile device from the error code tracking information data store, the different messaging identifier corresponding to an updated error code tracking information transmitted by the service provider;
  - identify messaging information from the at least one different messaging information data store according to the identified at least one messaging identifier; and
  - transmit the messaging information to the second mobile device.

11. The computer-implemented system as recited in claim 10, wherein the error code tracking information data store includes a mapping of an error code, a message type and a messaging identifier.

12. The computer-implemented system as recited in claim 10, wherein the computing device is operative to identify messaging information from the at least one messaging information data store according to the identified at least one messaging identifier and message type.

13. The computer-implemented system as recited in claim 10, wherein the computing device is operative to identify messaging information from the at least one messaging information data store according to the identified at least one messaging identifier.

14. The computer-implemented system as recited in claim 10, wherein the computing device is operative to obtain the response from the identified service provider component including the error code associated with the processing of the request from the mobile device in accordance with an application protocol interface.

15. A computer-implemented method for managing communications comprising:
- obtaining a request from a mobile device corresponding to a request for processing by a service provider;
- transmitting, via an established protocol, the request from the mobile device to an identified service provider component;
- obtaining, via an established protocol, a response from the identified service provider component, the response including an error code associated with the processing of the request from the mobile device;
- identifying at least one messaging identifier corresponding to the error code associated with the processing of the request from the mobile device from an error code tracking information data store, the error code tracking data store mapping error code information to messaging identifiers;
- identifying messaging information from a messaging information data store according to the identified at least one messaging identifier, wherein the messaging information data store maintaining messaging information to be provided to mobile device users and wherein the messaging information is associated with at least a messaging identifier;
- transmitting the messaging information to the mobile device;
- obtaining, via an established protocol, at least one of an update to the messaging information data store and the error code tracking information data store; and
- updating information based the at least one of an update to the messaging information data store and the error code tracking information data store.

16. The computer-implemented method as recited in claim 15 further comprising:
- obtaining a request from a second mobile device corresponding to a request for processing by the service provider;
- transmitting, via an established protocol, the request from the second mobile device to the identified service provider component;
- obtaining, via an established protocol, a response from the identified service provider component, the response including the error code associated with the processing of the request from the mobile device;
- identifying at least one different messaging identifier corresponding to the error code associated with the processing of the request from the mobile device from the error code tracking information data store;
- identifying messaging information from the at least one different messaging information data store according to the identified at least one messaging identifier; and
- transmitting the messaging information to the second mobile device.

17. The computer-implemented method as recited in claim 15, wherein updating information based the at least one of an update to the messaging information data store and the error code tracking information data store to the messaging information data store includes updating text associated with a messaging identifier.

18. The computer-implemented method as recited in claim 15, wherein updating information based the at least one of an update to the messaging information data store and the error code tracking information data store to the messaging information data store includes mapping a different messaging identifier to an error code.

19. The computer-implemented method as recited in claim 15, wherein updating information based the at least one of an update to the messaging information data store and the error code tracking information data store to the messaging information data store includes mapping a different error codes to a messaging identifier.

20. The computer-implemented method as recited in claim 15, wherein the error code tracking information data store includes a mapping of an error code, a message type and a messaging identifier.

21. The computer-implemented method as recited in claim 15, wherein the computing device is operative to identify messaging information from the at least one messaging information data store according to the identified at least one messaging identifier and message type.

22. The computer-implemented method as recited in claim 15, wherein the messaging information data store includes messaging information corresponding to two or more languages associated with at least one messaging identifier, the method further comprising identifying messaging information associated with one of the two or more languages responsive to the identified messaging identifier.

23. A computer-implemented system for managing communications, the system comprising:
    a processing code tracking data store for storing information processing code information to messaging identifiers;
    a messaging information data store for maintaining messaging information to be provided to mobile device users, the messaging information associated with at least a messaging identifier; and
    a computing device in communication with said data stores that is operative to:
        obtain, via an established protocol, at least one of an update to the messaging information data store and the processing code tracking information data store; and
        update information based the at least one of an update to the messaging information data store and the processing code tracking information data store;
        wherein the transmission of the processing codes to the computing device from a service provider component and responsive to service requests do not include messaging information or messaging identifiers.

24. The computer-implemented system as recited in claim 23, wherein an interface component associated with the computing device obtains the at least one of the updated to the messaging information data store and the processing code tracking information data store.

25. The computer-implemented system as recited in claim 23, wherein a service provider code processing component associated with the computing device updates information based the at least one of an update to the messaging information data store and the processing code tracking information data store.

26. The computer-implemented system as recited in claim 23, wherein the processing codes corresponds to error codes.

27. A computer-implemented method for managing communications comprising:
    obtaining a request from a mobile device corresponding to a request for processing by a service provider;
    transmitting, via an established protocol, the request from the mobile device to an identified service provider component, the service provider component identified in the request;
    obtaining, via an established protocol, a response from the identified service provider component, the response including an error code associated with the processing of the request from the mobile device;
    dynamically identifying at least one messaging identifier corresponding to the error code associated with the processing of the request from the mobile device from an error code tracking information data store, the error code tracking data store mapping error code information to messaging identifiers;
    dynamically identifying messaging information from a messaging information data store according to the identified at least one messaging identifier, wherein the messaging information data store maintaining messaging information to be provided to mobile device users and wherein the messaging information is associated with at least a messaging identifier; and
    transmitting the messaging information to the mobile device.

28. The computer-implemented method as recited in claim 27, wherein the error code tracking information data store includes a mapping of an error code, a message type and a messaging identifier.

29. The computer-implemented method as recited in claim 27, wherein the computing device is operative to identify messaging information from the at least one messaging information data store according to the identified at least one messaging identifier and message type.

* * * * *